ERROR CONTROL SYSTEM

Filed Feb. 1, 1965 3 Sheets-Sheet 1

INVENTOR
H. O. BURTON
BY Lucian C. Canepa
ATTORNEY 3,389,375

ERROR CONTROL SYSTEM

Herbert O. Burton, Little Silver, N.J., assignor to Bell Telephone Laboratories, Incorporated, New York, N.Y., a corporation of New York Filed Feb. 1, 1965, Ser. No. 429,386
8 Claims. (Cl. 340—146.1)

ABSTRACT OF THE DISCLOSURE

An identification circuit has been incorporated into an error control system employing a Peterson decoder in order to determine whether a corrected sequence delivered to the utilization circuit is a valid code element. The identification circuit is responsive to signals representative of information generated during the decoding cycle which is inherently determinative of the validity of a corrected code sequence and provides an output signal indicative thereof.

This invention relates to digital information-processing systems and more particularly to the automatic detection and/or correction of errors in such systems.

The problem of transmitting digital signals in a reliable manner over a noisy channel is a significant one whose solution has been actively sought. Some illustrative situations in which this problem arises are: when telephone lines subject to error impulses are being used to transmit data in digital form; when an imperfect medium such as magnetic tape or photographic emulssion is used to store digital data; or when operations on digital signals are being carried out by means of circuits constructed of devices such as relays, diodes or transistors which have a probability of error.

By using techniques involving the introduction of redundancy it is possible to encode digital data signals to be transmitted in such a way that a receiving terminal is able with a high degree of reliability to automatically correct received signals that are not exact replicas of the transmitted ones. Furthermore, a receiving terminal of this type can be constructed to have the capability of detecting the reception of certain kinds of uncorrectable signal sequences. Such uncorrectable sequences can be suitably tagged or designated to indicate their particular status to associated utilization circuitry. Also the receiving equipment can be designed such that the receipt of a detected uncorrectable sequence leads to a request to the transmitter for a retransmission of the sequence.

The so-called Bose-Chaudhuri-Hocquenghem (BCH) codes—as described, for example in (1) Bose, R. C., and Ray-Chaudhuri, D. K., "On a Class of Error-Correcting Binary Group Codes," Information and Control 3, 68–79 (1960); (2) "Error-Correcting Codes," by W. W. Peterson, The M.I.T. Press and John Wiley, 1961; and (3) "Codes Correcteurs D'erreurs, Chiffres, volume 2, pages 147–156, Sept. 1959—specify one particularly efficient manner in which digital data signal sequences to be transmitted along a noisy channel may be encoded to possess significant error control capabilities.

Data sequences which are encoded in a system in accordance with the BCH codes may be decoded in any one of several different ways which are well known in the art. One of these ways is the error-correction procedure described on pages 175–180 of the aforementioned Peterson text. This particular procedure will be referred to hereinbelow as the Peterson decoding algorithm.

The Peterson algorithm is applicable to decoding binary sequences which have been encoded in accordance with a $t$-error-correcting BCH binary code. An encoded sequence received by a Peterson decoder via a noisy communication channel is either (A) Hamming distance $t$ or less from some sequence of the code, or (B) Hamming distance $t+1$ or more from every sequence of the code. In accordance with the Peterson algorithm, a received sequence with errors is transformed into another sequence. If the received sequence is of type (A) the transformed sequence will be that code element which was distance $t$ or less from the received sequence. If, on the other hand, the received sequence is of type (B) the transformed sequence will not be a valid or allowable code element. In this latter case the "corrected" sequence delivered to associated utilization circuitry is, of course, incorrect. Hence, for reliable operation the decoder should embody some technique for determining whether the decoding performed was legitimate or not. If it was not legitimate, the sequence delivered to the utilization circuitry should be suitably tagged or designated as being an incorrect element. Or, if desired, a retransmission of the incorrect sequence could be requested.

One technique for determining whether a "corrected" sequence is a valid code element is to derive from the information digit portion of the decoded sequence a recalculated set of check digits. If these check digits are identical to those of the "corrected" sequence, then the sequence intended for delivery to the utilization circuitry is, in fact, an allowable sequence of the code that is embodied in the system. If the recalculated check digits are not identical to those of the "corrected" sequence the decoding equipment is signaled that the "corrected" sequence is not a valid code element.

The main disadvantage of the technique described in the paragraph immediately above is that it requires a considerable amount of equipment. This is due to the fact that what is needed at the decoder to perform the noted validity check is actually a duplicate of the encoding equipment located at the transmitting terminal. For relatively long binary sequences such encoding circuitry is complex.

Of course it would be possible to use some of the equipment already present in the decoder to recheck after decoding. However, this would require a higher decoder operating speed and more control and clock circuitry.

An object of the present invention is the improvement of digital information-processing systems.

More specifically, an object of this invention is a redundant digital information-processing system characterized by reliable error-control properties.

Another object of the present invention is an error control system utilizing a BCH code and having the capability to automatically correct a maximum of $t$ errors in each binary sequence processed thereby.

Yet another object of this invention is an error control decoder which can identify in a simple and reliable manner received binary sequences which are Hamming distance $t+1$ or more from all words of a particular BCH code.

These and other objects of the present invention are realized in a specific illustrative embodiment thereof which comprises an error control system having a Peterson decoder in combination with a remarkably simple identification circuit. The arrangement of the identification circuit is based on the discovery that certain portions of the information generated during the decoding cycle of operation have inherently embodied in them the essential characteristics determinative of whether or not a received sequence is at distance $t+1$ or more from every element of the BCH code being employed in the system.

In particular, one specific illustrative identification circuit made in accordance with the principles of the present invention has applied thereto as inputs three signals representative of information that is inherently generated during the application of the Peterson algorithm to the decoding process. This identification circuit, which includes only a counter, two flip-flops and two gates, selectively processes the noted three signals and provides an output signal indication of whether or not a decoded and "corrected" sequence is in fact a valid code element.

Thus, a modified Peterson decoder which embodies the principles of this invention performs a validity check on the operation of the decoder without the necessity of actually recalculating the parity digits of decoded sequences.

It is a feature of the present invention that an error control system, which comprises a Peterson decoder, include in combination therewith an identification circuit, which is responsive to certain specified signals generated during the decoding process, to supply a positive indication as to whether or not a "corrected" sequence is a valid code element.

It is another feature of this invention that the Peterson decoder of an error control system include in combination therewith an identification circuit comprising a counter, two flip-flops and two gates which are arranged to respond to three particular signals generated during the decoding process to provide a validity check on the operation of the decoder.

A complete understanding of the present invention and of the above and other objects, features and advantages thereof, may be gained from a consideration of the following detailed description of a specific illustrative embodiment presented hereinbelow in connection with the accompanying drawing, in which.

Figure 1:
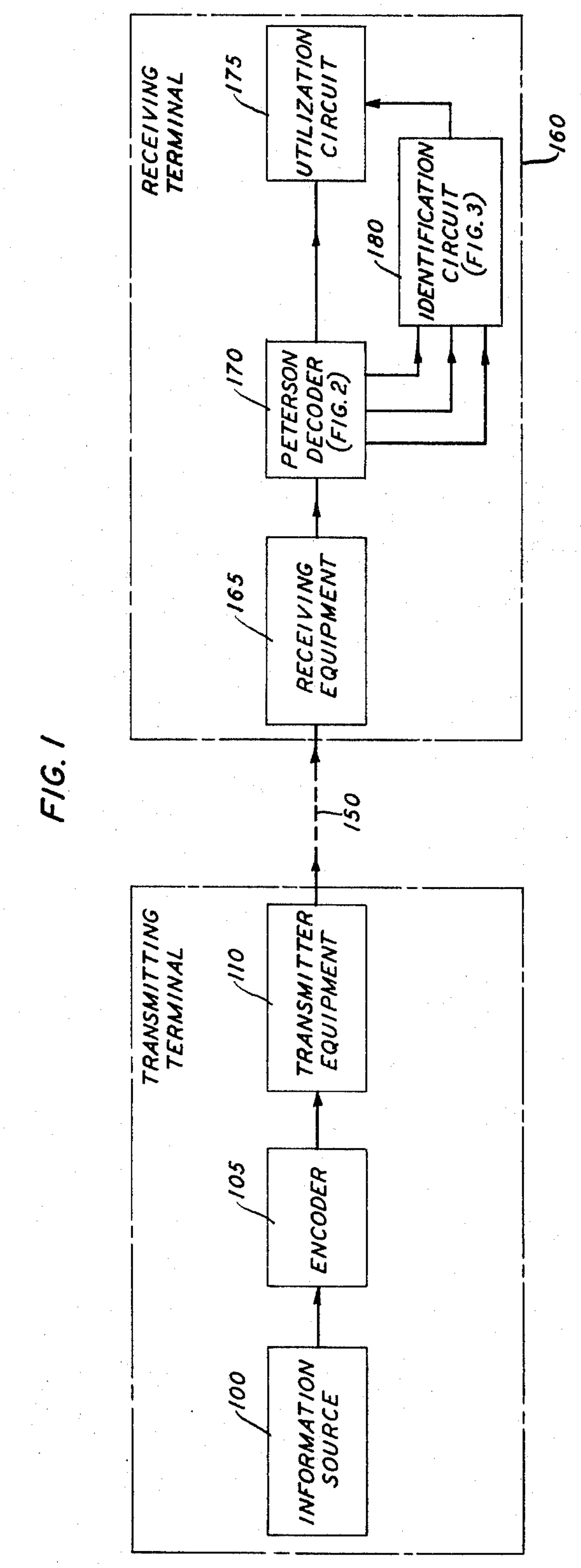
FIG. 1 is an over-all block diagram of an error control system which includes a Peterson decoder and a novel identification circuit combined in accordance with the principles of the present invention.

The circuit shown in FIG. 1 includes an information source 100 for supplying successive binary data signals, each $n$-digit sequence of which comprises a data word. The source 100 is assumed to be capable of generating $2^n$ different $n$-digit binary sequences. Herein, for illustrative purposes, $n$ will be assumed to be 5. Hence the source 100 will be considered to be capable of generating $2^5$ or 32 different 5-digit binary information sequences.

Each $n$-digit data sequence supplied by the source 100 is applied to an encoder 105 wherein a $k$-digit parity check sequence is derived from the $n$ data digits applied thereto. This derivation is accomplished in accordance with a suitable BCH code by means, for example, of a feedback shift register of the type described on page 150 of the above-cited Peterson text. The $k$ check digits so generated are appended to the corresponding $n$-digit data sequence and are then applied in combination therewith to associated transmitting equipment 110 which may include modulators, amplifiers, multiplexing equipment, or any other facilities necessary to prepare the signals for application to a noisy or error-prone communication channel 150.

The channel 150 may comprise a signal-propagating connection between associated circuits positioned at a single location. Or the channel may comprise a suitable transmission medium such as a telephone or teletypewriter line, a high-frequency coax or wave-guiding medium, or even a radio link without an actual physical connection between the transmitting and receiving terminals described herein. Furthermore, the channel 150 may not even be a transmission link but may instead be a storage medium such as a magnetic tape or drum.

Each redundant sequence applied to the channel 150 comprises $n+k$ digits the first $n$ of which are information or data signals and the last $k$ of which are parity check signals added for error control purposes. As noted above, $n$ herein will be assumed to be 5. Correspondingly, $k$ will be assumed for illustrative purposes to equal 10. By means of a resulting well-known BCH (15, 5) code, it is possible at a receiving terminal 160 (FIG. 1) to automatically correct for the occurrence of a maximum of $t$ errors in the digits of each transmitted binary sequence. (In the specific illustrative case considered herein $t=3$).

The receiving terminal 160 shown in FIG. 1 includes conventional receiving equipment 165 to which a redundant information sequence is applied from the channel 150 for demodulation, amplification, or any other process required to place the transmitted signals in their original representative form. Thereafter the received sequences are applied to a Peterson decoder 170 (shown in detail in FIG. 2) wherein automatic correction of mutilated digits takes place.

If a received 15-digit sequence applied to the decoder 170 in FIG. 1 contains 0, 1, 2 or 3 errors in the digits thereof, the decoder 170 will automatically transform the applied sequence into that element of the BCH (15, 5) code which is distance 0, 1, 2 or 3, respectively, from the mutilated redundant word. The corrected sequence is then applied to a utilization circuit 175. Also signals representative of information generated during the decoding operation are applied to an identification circuit 180 (shown in detail in FIG. 3) wherein they are selectively processed to provide a signal to the utilization circuit 175 indicative of whether or not the corrected sequence is a valid code element. In the particular case in which a maximum of three errors is assumed to exist in the received 15-digit sequence, the circuit 180 provides a signal to the circuit 175 to indicate that the transformed sequence provided by the decoder 170 is in fact an element of the BCH (15, 5) code embodied in the depicted system.

On the other hand, assume that a received 15-digit sequence applied to the decoder 170 contains, say, four errors. The decoder 170 will respond to such a sequence by transforming it into another 15-digit element. However, in this case, the mutilated word is outside the error-correcting capabilities of the system and the transformed word may be found not to be a member of the BCH (15, 5) code set. To indicate this fact to the utilization circuit 175 the identification circuit 180 responds to signals derived from the decoder 170 to apply a signal to the circuit 175 representative of the transformed element not being a valid code word. In this way the utilization circuit is positively notified as to the invalid status of the decoded word applied thereto. If a corrected version of the sequence that was incorrectly decoded is desired, a retransmission of the mutilated sequence can be requested. Illustratively, such a request can be implemented in the manner disclosed in a copending application of L. P. McRae, R. N. Watts and W. J. Wolf, Jr., Ser. No. 356,528, filed Apr. 1, 1964. By such detection and retransmission techniques, effective error correction can be realized.

It is, of course, possible that a particular code sequence may be distorted during transmission to the extent that it is actually converted into another element of the code being employed, or that it is converted into a sequence which is Hamming distance $t$ or less from some other code element. In such a case, the decoded word delivered to the utilization circuit 175 is a valid code element (albeit the wrong one) and the identification circuit 180 would signal the circuit 175 that the word applied thereto is acceptable. Sequences of this type are seen to be outside both the error-correcting and detecting capabilities of the illustrative system.

To summarize: a received $n$ digit sequence which is applied to the decoder 170 of FIG. 1 is either (A) Hamming distance $t$ or less from some code element; or (B) Hamming distance $t+1$ or more from every element of the code.

Figure 2:
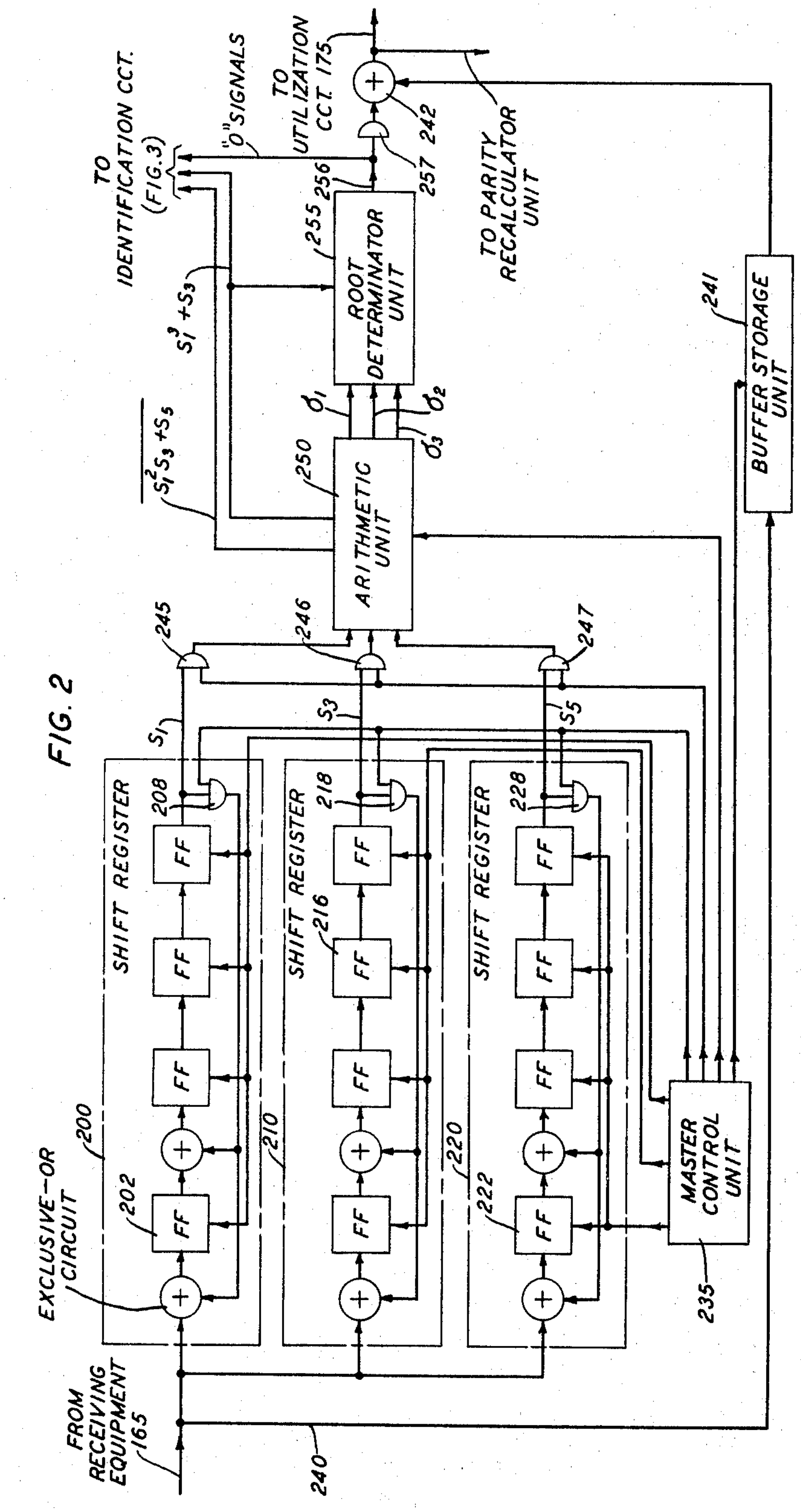
FIG. 2 illustrates the configuration of the Peterson decoder shown in FIG. 1.

Before proceeding to a description of the illustrative Peterson decoder shown in FIG. 2, it will be helpful to a better understanding thereof to briefly summarize the essential concepts involved in Peterson's decoding algorithm as applied to a BCH (15, 5) code. The arithmetic computations in the decoding algorithm are carried out in the field of 16 elements generated by a root of $x^4+x+1$. Let these elements be denoted 0, 1, $\alpha$, $\alpha^2$, . . . $\alpha^{14}$. The 15 non-zero elements of this particular field are listed in Table 6.1 on page 100 of the above-cited Peterson text. Each of these elements is associated with a particular digit position of a 15-digit code sequence. Specifically, if the positions of a code word are numbered 0, 1, 2 . . . 14 then the correspondence therebetween is as follows:

$$0, 1, 2 \ldots 14$$
$$\alpha^0, \alpha^1, \alpha^2 \ldots \alpha^{14} \qquad (1)$$

(In this representation the right-most 5 digits numbered 14, 13, 12, 11 and 10, are information digits and the remaining digits of the 15-digit sequence are parity check digits.)

Suppose a received sequence contains errors (i.e., "1's" changed to "0's" or "0's" changed to "1's") in digit positions 1, 2 and 3 of a 15-digit code element. When the Peterson algorithm is applied to decode this sequence, a third degree polynominal is obtained which has $\alpha^1$, $\alpha^2$ and $\alpha^3$ as roots. Specifically, the polynomial will be as follows:

$$x^3+\sigma_1x^2+\sigma_2x+\sigma_3=(x-\alpha^1)(x-\alpha^2)(x-\alpha^3) \qquad (2)$$

If only two errors occurred in the sequence, say, in digit positions 1 and 2, the polynomial will be $$(x-\alpha^1)(x-\alpha^2)(x-0)=x(x-\alpha^1)(x-\alpha^2) \qquad (3)$$

If only one error occurred, the polynomial wil be of first-degree:

$$x+\sigma_1=x-\alpha^1 \qquad (4)$$

Decoding is accomplished by finding the roots of the appropriate polynomial and then using the correspondence defined above in (1) to identify the particular digits which are in error. For the binary case, the location of the errors is all one needs to know in order to be able to correct the erroneous digits by the simple expedient of respectively inverting them.

Thus the two basic steps in the Peterson algorithm are (a) determination of the coefficients $\sigma_1$, $\sigma_2$ and $\sigma_3$ of the third degree polynomial (or the coefficient $\sigma_1$ of the aforenoted first degree polynominal), and (b) solution of the equation $$x^3+\sigma_1x^2+\sigma_3=0$$
$$(\text{or } x+\sigma_1=0) \qquad (5)$$

for the roots thereof, which in turn give the locations of the erroneous digits.

The coefficients $\sigma_1$, $\sigma_2$ and $\sigma_3$ are obtained by solving the following system of three linear equations:

$$S_1+\sigma_1=0$$
$$S_3+S_2\sigma_1+S_1\sigma_2+\sigma_3=0 \qquad (6)$$
$$S_5+S_4\sigma_1+S_3\sigma_2+S_2\sigma_3=0$$

where the $S_j$'s are power-sum symmetric functions as defined in references 82, 99 and 112 of the Peterson text. Since $S_2=S_1^2$ and $S_4=S_1^4$, solving (6) for the $\sigma$'s gives:

$$\sigma_1=S_1,\ \sigma_2=\frac{S_1^2S_3+S_5}{S_1^3+S_3} \qquad (7)$$
$$\sigma_3=\frac{S_1S_5+S_3^2+S_1^3S_3+S_1^6}{S_1^3+S^3}$$

provided that $S_1^3+S_3\neq0$. If $S_1^3+S_3=0$, there is only one error in the received sequence.

Having calculated the coefficients $\sigma_1$, $\sigma_2$ and $\sigma_3$, the next step in the Peterson decoding process is to solve the equation $$x^3+\sigma_1x^2+\sigma_2x+\sigma_3=0 \qquad (8)$$

provided that $S_1^3+S_3\neq0$. If $S_1^3+S_3=0$, the equation to be solved is:

$$x+\sigma_1=0 \qquad (9)$$

In either case the equation is solved by successively substituting the non-zero quantities $\alpha^0$, $\alpha^1$, $\alpha^2$ . . . $\alpha^{14}$ of the aforementioned 16 element field for $x$. Whenever the result of the substitution is a "0" the corresponding digit of the sequence being decoded is identified as being in error. Correction of the detected erroneous digit is then accomplished simply by inverting it.

It is noted that the application of the foregoing principles to the specific case of correcting three errors in a received 15-digit sequence is considered in detail in an example set forth on pages 179–180 of the aforecited Peterson text.

FIG. 2 shows a specific illustrative Peterson decoder suitable for decoding 15-digit binary sequences which are applied thereto from the receiving equipment 165 (FIG. 1). The first digit of such a sequence is applied to the respective inputs of conventional feedback-type first, second and third shift registers 200, 210 and 220 each of which is composed of a gate circuit and interconnected flip-flops and EXCLUSIVE-OR circuits. Additionally, the first digit and all subsequent digits of a received sequence are applied via a line 240 to a buffer storage unit 241 for subsequent application under control of a master unit 235 to an EXCLUSIVE-OR circuit 242 which actually performs the digit-by-digit correction function.

After receipt by the shift registers 200, 210 and 220 of the first digit of a 15-digit sequence, the master control unit 235 applies shift pulses to the three registers. In particular, the first register 200 is shifted once thereby placing the first digit applied thereto in the flip-flop 202. The second shift register 210 is shifted three times thereby placing the first digit in the flip-flop 216, and the third shift register 220 is shifted five times thereby placing the first digit applied thereto in the flip-flop 222. Then the second digit of the received sequence is applied to the three registers and the 1–3–5 shifting pattern is repeated. Subsequently, successive application of the other digits of the received sequence to the shift register in an exactly similar manner is carried out under control of the master unit 235. At the conclusion of this phase of the decoding operation the shift register 200 has stored therein a 4-digit binary number which is the quantity $S_1$ referred to above. Similarly, the registers 210 and 220 have at that time stored therein the quantities $S_3$ and $S_5$, respectively.

Subsequently, the three gate circuits 208, 218 and 228 respectively included in the shift registers 200, 210 and 220 are disabled and three gate circuits 245, 246 and 247 which interconnect the shift registers to an arithmetic unit 250 are enabled, all under control of the master unit 235. In this way the three 4-digit representations $S_1$, $S_3$ and $S_5$ are applied to the unit 250 for processing and calculation of three 4-digit binary numbers representative of the coefficients $\sigma_1$, $\sigma_2$ and $\sigma_3$.

In the arithmetic unit 250 selective addition and multiplication of the aforementioned binary expressions for $S_1$, $S_3$ and $S_5$ are carried out to provide 4-digit binary representations of the following expressions:

$$S_1^2,\ S_1^2,\ S_3,\ S_1^2\,S_3+S_5,\ S_1^3 \text{ and } S_1^3+S_3$$

Then the unit 250 proceeds to calculate on a binary basis the multiplicative inverse of $S_1^3+S_3$, and this result is subsequently multiplied by $S_1^2\,S_3+S_5$ to provide a 4-digit binary expression for coefficient $\sigma_2$ as defined by (7). In turn a 4-digit binary representation $\sigma_3$ is calculated by the unit 250 in accordance with the equation $\sigma_3=S_1\sigma_2+(S_1^3+S_3)$ and as noted in (7) $\sigma_1=S_1$. Additionally, arithmetic unit 250 generates a 1-digit binary signal (depicted in FIG. 2 as "$S_1^3+S_3$") expressive of whether or not the quantity $S_1^3+S_3$ is non-zero. In particular, if $S_1^3+S_3$ is non-zero it is represented by a "1"; conversely, if it is identically zero it is expressed as a "0." Unit 250 further determines whether the sum $S_1^2S_3+S_5$ is non-zero and generates a 1-digit representation thereof. The binary inverse of this signal is then generated by a conventional inverter gate contained in unit 250. Denoted as $\overline{S_1^2S_3+S_5}$ in FIG. 2 and FIG. 3, this 1-digit signal is "1" if $S_1^2S_3+S_5$ is zero and is "0" if $S_1^2S_3+S_5$ is non-zero.

Thus the arithmetic unit 250 provides as outputs three 4-digit binary numbers respectively representative of the coefficients $\sigma_1$, $\sigma_2$ and $\sigma_3$. These three numbers, as well as the binary signal representative of whether or not the sum $S_1^3+S_3$ is non-zero, are applied to a root determinator unit 255 wherein an attempt to solve Equation 8 or 9 takes place. Illustratively, the unit 255 may be of the type shown in FIG. 2 of "Cyclic Decoding Procedures for Bose-Chaudhuri-Hocquenghem Codes," by R. T. Chien, *IEEE* Transactions on Information Theory, October 1964, pages 357–363.

In the root determinator unit 255 every one of the 15 field elements specified above is substituted in succession into Equation 8 or 9. Those field elements that satisfy the appropriate equation correspond to error locations. Each such element will, therefore, cause a "0" signal to appear on output lead 256 emanating from the unit 255. Each of these "0" signals is inverted by an inverter unit 257 and is then applied as a correction signal to the EXCLUSIVE-OR circuit 242. Also applied to the circuit 242 are the respective digits of the received 15-digit sequence. In particular, these digits are applied in sequence from the unit 241 to the circuit 242 in synchronism with the successive attempts to satisfy Equation 8 or 9. More specifically, the first information digit of the received sequence is applied to the circuit 242 in approximate time coincidence with the attempt in the root determinator unit 255 to satisfy Equation 8 or 9 with the field element $\alpha^{14}$. If $\alpha^{14}$ satisfies the equation (indicative of the first information digit being in error ) a "0" signal is applied to the output lead 256. In turn, this signal is inverted by the unit 257 and is then applied as a "1" signal to the circuit 242. As a result, the first information digit applied to the EXCLUSIVE-OR circuit 242 by the circuit 241 will be inverted and thereby corrected before delivery to the utilization circuit 175. In an exactly similar manner every one of the other digits of a received sequence is passed through the circuit 242 and corrected or not before being applied to the circuit 175.

To check the performance of a Peterson decoder to determine whether each corrected sequence thereof is in fact a valid element of the BCH code being employed, it was heretofore necessary to apply the output of the EXCLUSIVE-OR circuit 242 to a parity recalculator unit, as indicated in FIG. 2. However, in accordance with the present invention, this is no longer necessary. Instead, signals generated during the above-described application of the Peterson decoding algorithm are selectively processed by a circuit of the type shown in FIG. 3 to provide a positive indication of the validity of each "corrected" sequence.

Figure 3:
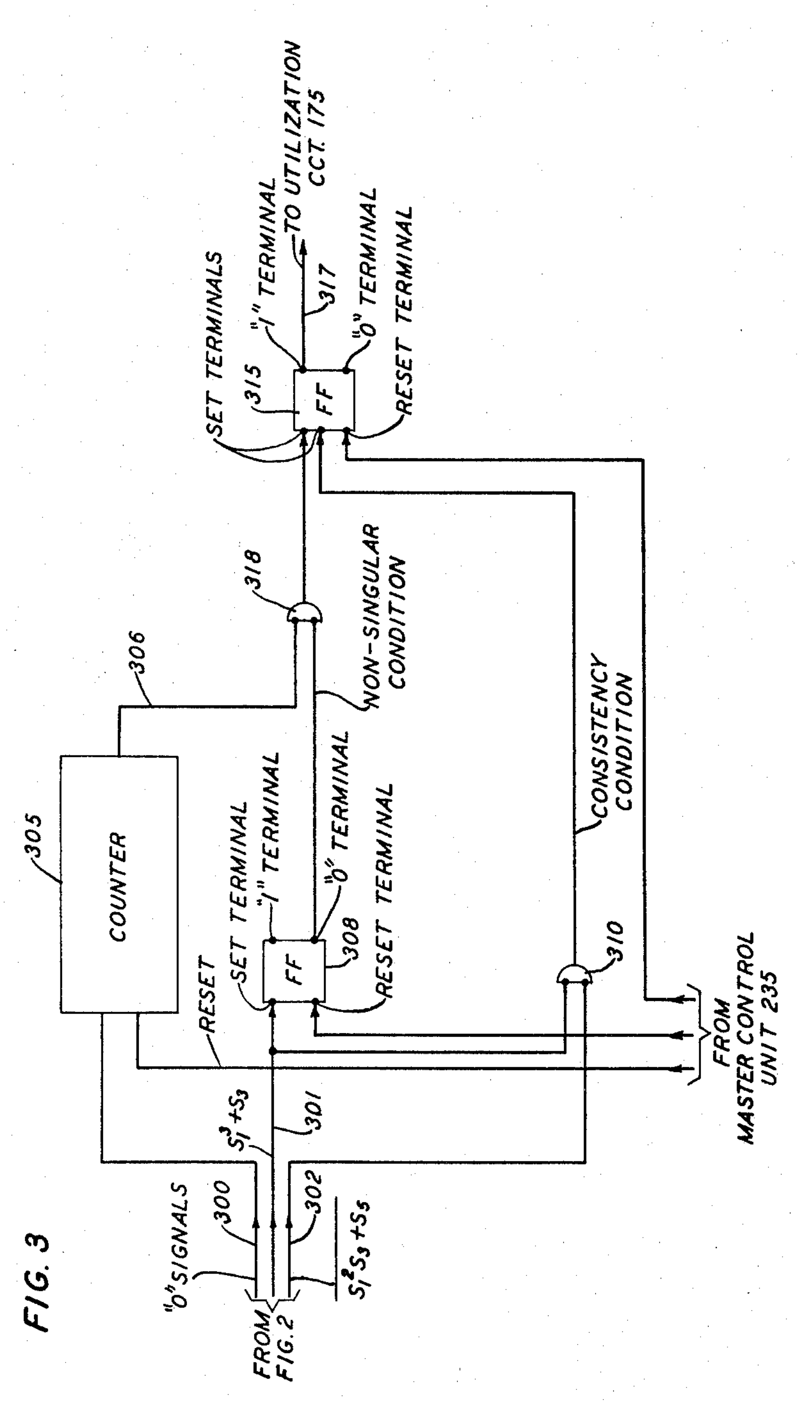
FIG. 3 is a detailed showing of a specific illustrative identification circuit suitable for inclusion in FIG. 1.

Before proceeding to a description of FIG. 3 the basic principles underlying the present invention will be set forth. In accordance with this invention it has been discovered that if a received sequence is Hamming distance $t+1$ or more from every element of the BCH code embodied in a system, either (i) the system of linear equations $\sigma_1$, $\sigma_2$ and $\sigma_3$ (for $t=3$) will be inconsistent (no solution) or (ii) the matrix of coefficients of the system of linear equations will be nonsingular but the polynomial given in (5) will not factor into linear factors over the field of 16 elements (i.e., the polynomial contains irreducible factors). The illustrative circuit of FIG. 3 determines in effect whether either situation (i) or (ii) obtains.

The system of linear equations is inconsistent if $$S_1^3+S_3=0$$

and $$S_1^2S_3+S_5\neq 0$$

Thus if $S_1^3+S_3=0$ and if $S_1^2S_3+S_5$ is represented by a "1" (for a binary system) the system of equations is inconsistent and an indication that the "corrected" element is not a valid code sequence should be provided. On the other hand, if both of the expressions in (10) are represented by "0's" the equations are consistent and the coefficient matrix is singular whereby neither (i) or (ii) above is satisfied, which indicates that the corrected sequence is in fact a valid code element.

If $S_1^3+S_3$ is represented by a "1" signal, the aforenoted matrix coefficient is indicated as being nonsingular. If, in this case only one or no "0" is generated by the root determinator unit 255 (FIG. 2) as it attempts to satisfy the third-degree polynomial (8) situation (ii) is encountered and again an indication should be provided that the "corrected" element is not a valid code sequence.

The inputs to the identification circuit shown in FIG. 3 are (I) the "0" signals generated by the root determinator unit 255, (II) a binary digit representative whether or not the sum $S_1^3+S_3$ is non-zero, and (III) the inverse of the binary digit that is representative of whether or not the sum $S_1^2S_3+S_5$ is non-zero, namely $\overline{S_1^2S_3+S_5}$. The noted "0" signals are applied to a counter 305 which is arranged to provide a "0" signal output on lead 306 if one or no "0" signal is applied thereto and to provide a "1" signal output on the lead 306 if two or three "0" signals are applied thereto. The binary signal representative of whether the quantity $S_1^3+S_3$ is non-zero is applied to the SET input terminal of a flip-flop 308 and to one input terminal of a NOT-AND gate circuit 310. The binary signal $\overline{S_1^2S_3+S_5}$ is applied to the other input terminal of the gate circuit 310.

The upper input terminals of the flip-flops 308 and 315 are SET terminals and the lower input ones thereof are RESET terminals. Moreover, in accordance with conventional practice the upper output terminal of the flip-flop 315 is its "1" output terminal and the lower output terminal of the flip-flop 308 is its "0" output terminal. Subsequent to identification of each 15-digit sequence, the counter 305 and the flip-flops 308 and 315 of FIG. 3 are reset by signals applied thereto from the master control unit 235.

A NOT-AND gate circuit provides a "1" output signal if all inputs thereto are "0" signals and otherwise provides a "0" output signal. Thus, if, as specified above for the binary case, the quantities $S_1^3+S_3$ and $\overline{S_1^2S_3+S_5}$ are each represented by a "0" signal (indicative of the system of linear equations being inconsistent) the gate circuit 310 will provide a "1" signal to the lower one of the two SET terminals of the flip-flop 315. In turn, this will cause the output lead 317 of the flip-flop 315 to supply a "1" signal to the utilization circuit 175 to indicate that the "corrected" sequence delivered thereto is not a valid code element. In this way the circuit of FIG. 3 is seen to implement the relationships specified in (10) above, namely $S_1^3+S_3=0$ and $S_1^2S_3+S_5\neq 0$.

If both of the expressions in (10) are zero, that is, $S_1^3+S_3=0$ and, $S_1^2S_3+S_5=0$, a "0" signal is applied to input lead 301 in FIG. 3 and a "1" signal is applied to input lead 302. As a result, the gate circuit 310 does not apply a SET signal to the flip-flop 315. Furthermore, the flip-flop 308 remains in its RESET condition under these circumstances, whereby a "1" signal is applied from the lower output terminal thereof to a NOT-AND gate circuit 318. Consequently, the gate circuit 318 also does not apply a SET signal to the flip-flop 315 which, therefore, supplies a "0" signal to the utilization circuit 175 to indicate that the "corrected" sequence is a valid code element. This output signal on the lead 317 is, of course, in accordance with the result described above as obtaining for the case wherein both of the expressions in (10) are "0".

If the signal applied to the input lead 301 is a "1" representation (indicative of the matrix coefficient being nonsingular) the output of the gate circuit 310 will be a "0" signal and the output applied to the gate circuit 318 from the set flip-flop 308 will be a "0" signal. If, under these conditions, the counter 305 also supplies a "0" signal to the gate circuit 318, the circuit 318 will provide a "1" or SET signal to the flip-flop 315. And, as specified above, the counter 305 provides such a "0" output signal if no or one "0" signal is applied to the input thereof from the root determinator unit 255 shown in FIG. 2. As a result of such a SET signal applied thereto, the flip-flop 315 provides a "1" signal to the utilization circuit 175 to signal that the "corrected" sequence is not a valid code element, which indicates in effect to the circuit 175 that the conditions specified in (ii) above have been found to exist.

Thus, in the manner detailed above, the relatively simple circuit depicted in FIG. 3 responds to certain specified ones of the signals generated during the operation of the decoder of FIG. 2 to supply to the utilization circuit 175 a positive indication as to whether or not the 15-digit sequences which appear at the output of the correcting EXCLUSIVE-OR circuit 242 are valid elements of the BCH (15,5) code embodied in the specific illustrative system described herein. It is significant to note that the arrangement of the FIG. 3 circuit remains the same even if other triple-error-correcting BCH codes of the generalized form $(n+k,n)$ are employed. Accordingly, even when decoding relatively long sequences, such as those of a triple-error-correcting BCH (255, 230) code, the FIG. 3 configuration need not be changed.

It is emphasized that although particular attention herein has been directed to the case of triple-error-correcting BCH codes, the principles of the present invention are also clearly applicable to $t$-error-correcting BCH codes. In the $t$-error case, conditions of the type specified above in (i) and (ii) hold. In general, if a received sequence is Hamming distance $t+1$ or more from every element of a BCH code, either a system of linear equations which is inconsistent will be obtained or a polynomial will be obtained which contains irreducible factors.

Further, it is noted that detailed circuit configurations for the units 235, 241, 250 and 305 shown in FIGS. 2 and 3 have not been given herein because their arrangements are considered, in view of the end requirements therefor set forth above, to be clearly within the skill of the art. For example, the procedure for designing circuitry suitable for use in arithmetic unit 250 has been considered in detail by T. C. Bartee and D. I. Schneider in "An Electronic Decoder for Bose-Chaudhuri-Hocquengheim Error-Correcting Codes," Institute of Radio Engineers Transactions on Information Theory, vol. 8, No. 5, pages S17–24, 1962, and in "Computation with Finite Fields," Information and Control, vol. 6, No. 2, pages 79–98, 1963.

Finally, it is to be understood that the above-described arrangements are only illustrative of the application of the principles of the present invention. Numerous other modifications and alternative arrangements may be devised by those skilled in the art without departing from the spirit and scope of the invention.

What is claimed is:

1. In combination in apparatus for decoding Bose-Chaudhuri-Hocquenghem (BCH) code sequences which may have been distorted during propagation along a noisy communication channel, means embodying the Peterson decoding algorithm for converting each received sequence into a "corrected" sequence, said means including means for generating during the application of said algorithm characteristic signals representative of the decoding process, and identification means responsive to said characteristic signals for providing a positive indication as to whether or not a "corrected" sequence is a valid sequence of the particular BCH code embodied in said apparatus.

2. A combination as in claim 1 wherein said converting means includes first means responsive to each received sequence for providing signals representative of three power-sum symmetric functions designated $S_1$, $S_3$ and $S_5$ and for processing said representative signals to provide signals indicative of $S_1^3+S_3$ and $\overline{S_1^2S_3+S_5}$.

3. A combination as in claim 2 further including root determinator means connected to said first means for providing signals representative of the number of errors detected in each received sequence.

4. A combination as in claim 3 wherein said identification means includes circuit means responsive to the signals representative of (1) $S_1^3+S_3$ and $\overline{S_1^2S_3+S_5}$ and (2) the number of detected errors, for determining whether or not (a) $S_1^3+S_3=0$ and $S_1^2S_3+S_5\neq 0$; or (b) $S_1^3+S_3=1$ and the number of detected errors is zero or one.

5. A combination as in claim 4 wherein said circuit means includes a counter responsive to the signals representative of the number of detected errors for providing an output signal indicative thereof, a first flip-flop and a first NOT-AND gate circuit each responsive to the signals representative of $S_1^3+S_3$, said first gate circuit also being responsive to the signals representative of $\overline{S_1^2S_3+S_5}$, a second NOT-AND gate circuit responsive to the output condition of said first flip-flop and to the output signal of said counter, and a second flip-flop responsive to the outputs of said first and second gate circuits for providing an output indication as to whether or not the decoded sequences are valid.

6. Apparatus for decoding Bose-Chaudhuri-Hocquenghem codes and for indicating whether or not the decoded sequences are valid elements of the particular code set embodied in the apparatus, said apparatus comprising a decoder for selectively translating each sequence, said decoder including means for providing first signals representative of intermediate expressions generated during the decoding process and for providing second signals representative of the number of errors detected in each sequence, and means responsive to said first and second signals for positively indicating whether or not each translated sequence is a valid element of the code set.

7. An identification circuit adapted to selectively process first, second and third input signals derived from a binary sequence and to provide a main output signal indicative of the nature of said sequence, comprising means for counting said first signals and for providing an intermediate signal indicative of the number of first signals, controlled means adapted to provide either a "0" or a "1" main output signal, means responsive to said intermediate signal and to said second signal for controlling the output condition of said controlled means, and means responsive to said second and third signals for also controlling the output condition of said controlled means.

8. Apparatus for decoding a $t$-error-correcting BCH code (where $t$ is any positive integer) and for indicating whether or not each decoded sequence is Hamming distance $t+1$ or more from every element of the code, said apparatus comprising a decoder for selectively translating each sequence, said decoder including means for generating signals indicative of whether the system of linear equations representative of each sequence is inconsistent and whether the polynomial representative thereof contains irreducible factors, and means responsive to said generated signals for indicating whether each translated sequence is a valid element of the code.

References Cited

UNITED STATES PATENTS 2,956,124 10/1960 Hagelbarger ---------- 178—69

MALCOLM A. MORRISON, *Primary Examiner.*

C. E. ATKINSON, *Assistant Examiner.*